Jan. 26, 1971 D. M. WILSON 3,557,610
ULTRASONIC TESTING APPARATUS
Filed March 11, 1968 5 Sheets-Sheet 1

INVENTOR
DONALD M. WILSON
BY
ATTORNEYS

United States Patent Office 3,557,610
Patented Jan. 26, 1971

3,557,610
ULTRASONIC TESTING APPARATUS
Donald Malcom Wilson, Linton, England, assignor to S.T.D. Services Limited, Birmingham, England, a British company
Filed Mar. 11, 1968, Ser. No. 712,086
Int. Cl. G01n 29/04
U.S. Cl. 73—67.5     2 Claims

ABSTRACT OF THE DISCLOSURE

An ulta-sonic testing equipment uses a series of receiving transducers which are scanned by a ring counter arrangement. The signals from the transducers are fed to a variable gain amplifier. A series of separate pre-set gain control circuits associated with the amplifier are scanned in synchronism with the scanning of the transducers to allow for variations in the sensitivity of the transducers.

---

This invention relates to apparatus for the testing of tubes and other elongated bodies by ultrasonics. It has been proposed, in the past, to utilise a series of ultrasonic transducers which are sequentially connected to a flaw detection device. It has been found however that with such an arrangement different crystals, having slightly different properties will not produce signals of the same magnitude when an ultrasonic sound signal of a given intensity falls upon them. Accordingly, it is an object of the invention to provide ultrasonic testing equipment of this general type in which allowance is made for transducers of different sensitivity.

According to the invention there is provided apparatus for the ultrasonic testing of tubes and other elongated bodies comprising a plurality of ultrasonic transducers, an amplifier for amplifying signals produced by said transducers when ultrasonic waves fall upon them, sequence control means for permitting passage of signals from said transducers to the amplifier in a cyclic sequence and automatic gain control means for the amplifier incorporating a plurality of pre-settable circuits operable sequentially in synchronism with said sequence control means.

Figure 1:
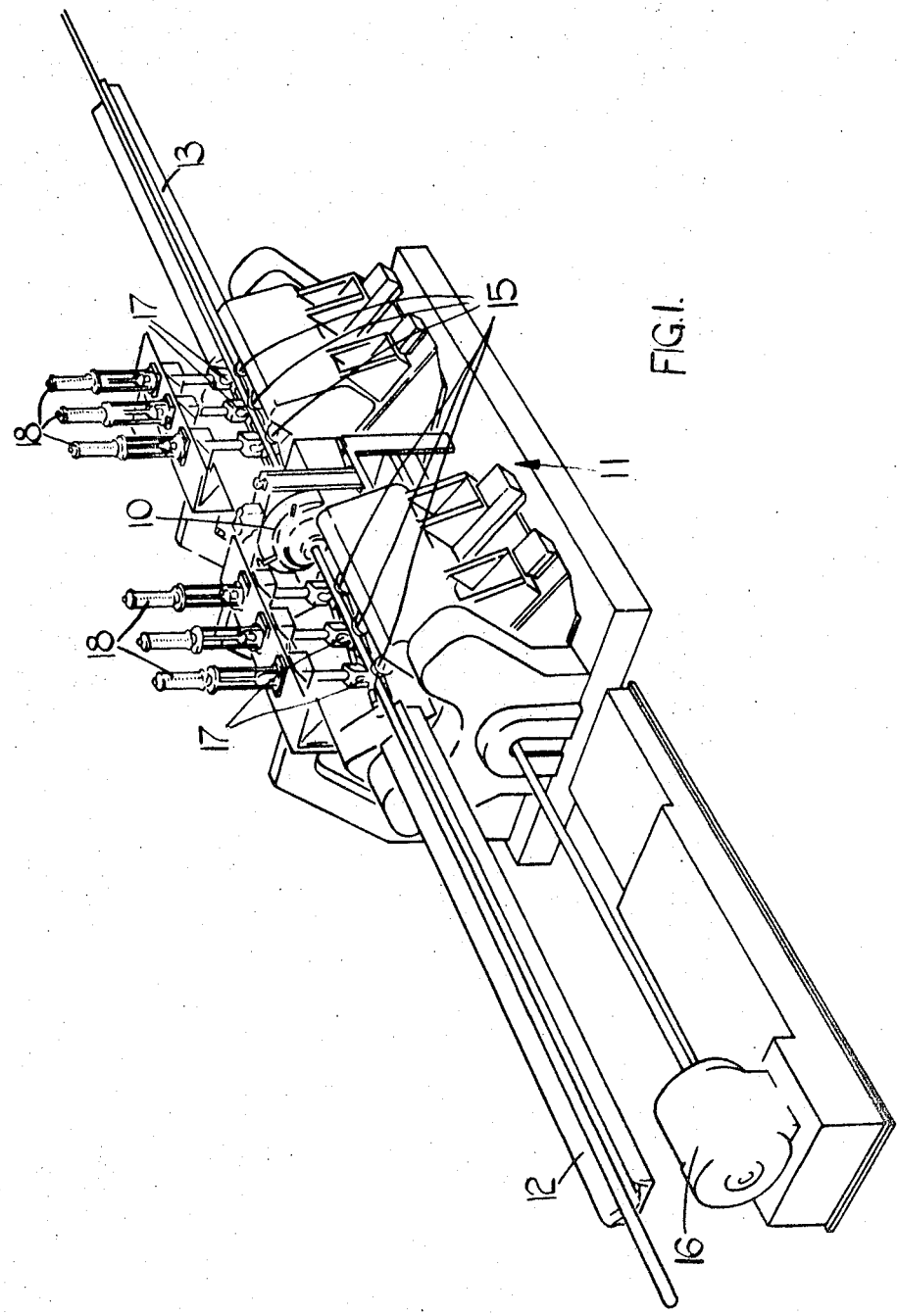
Figure 2:
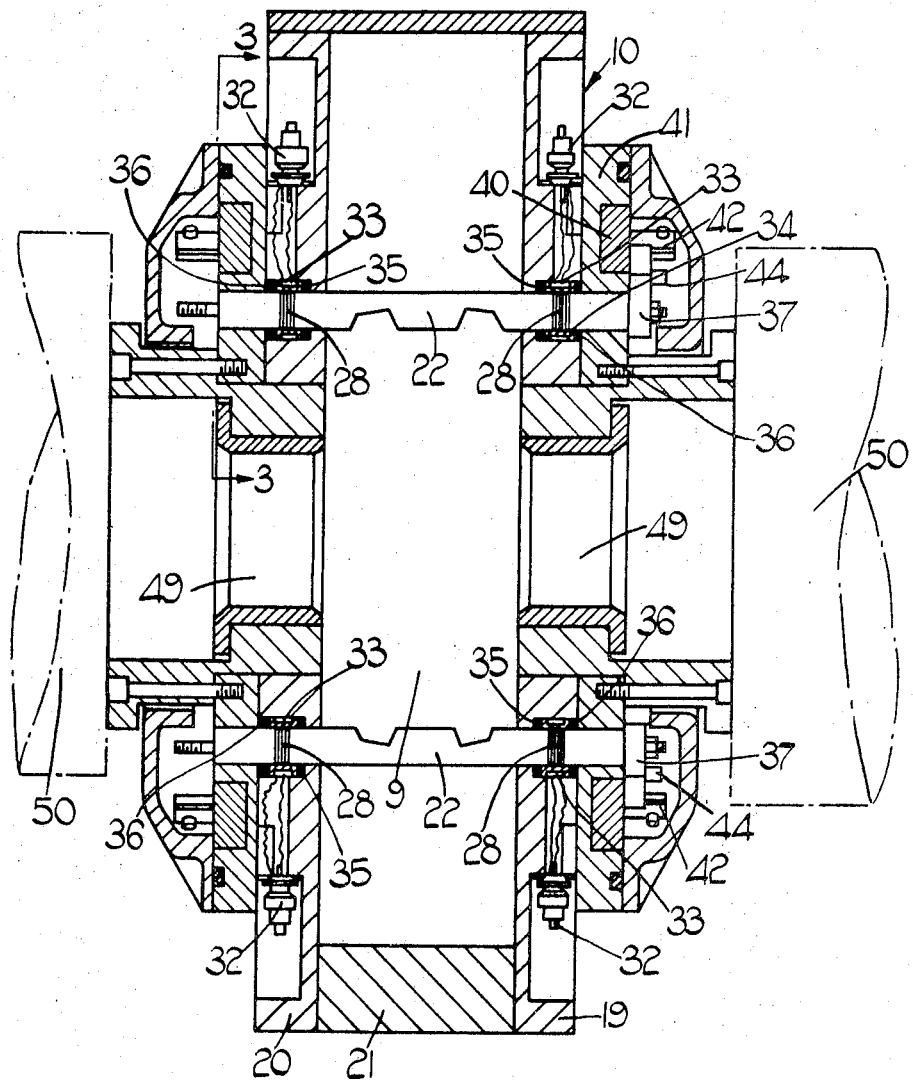
Figure 3:
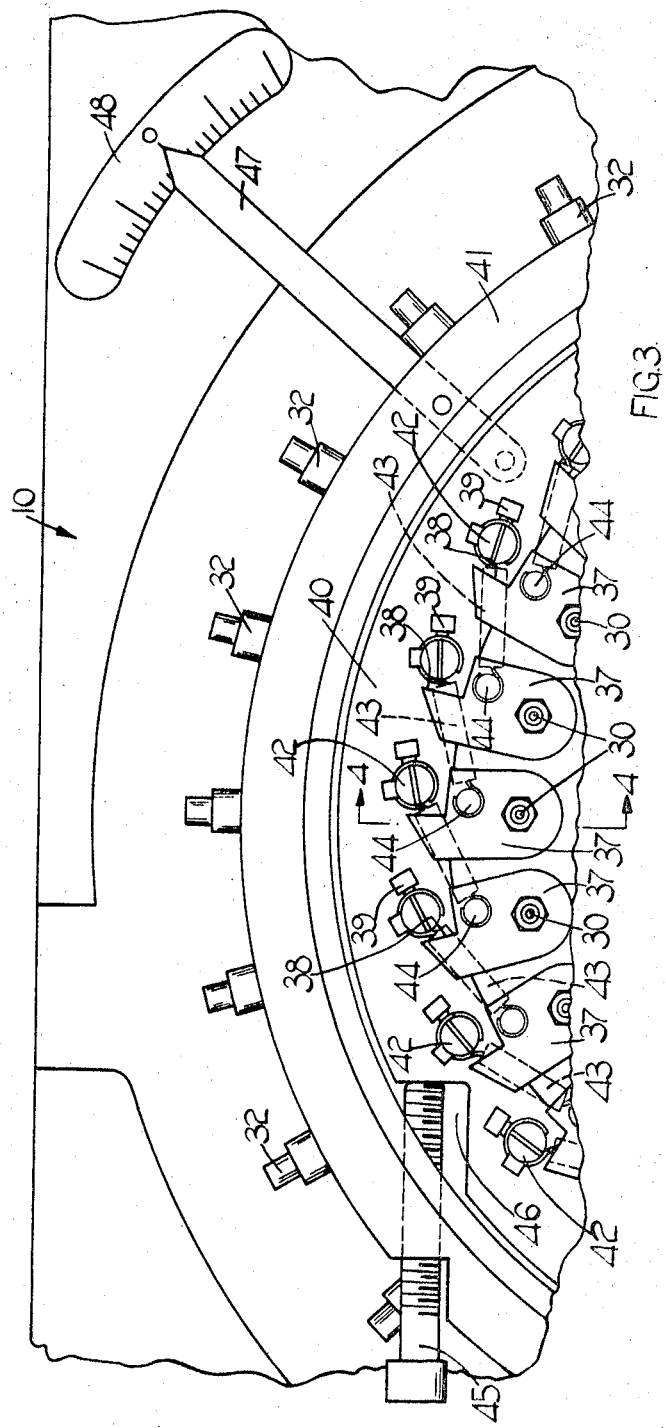
Figure 4:
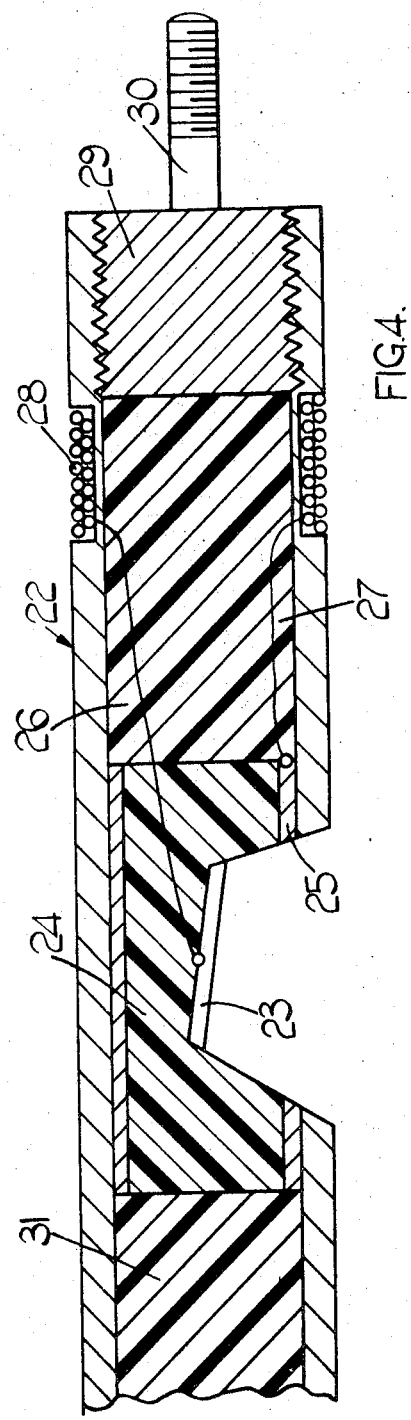
Figure 5:
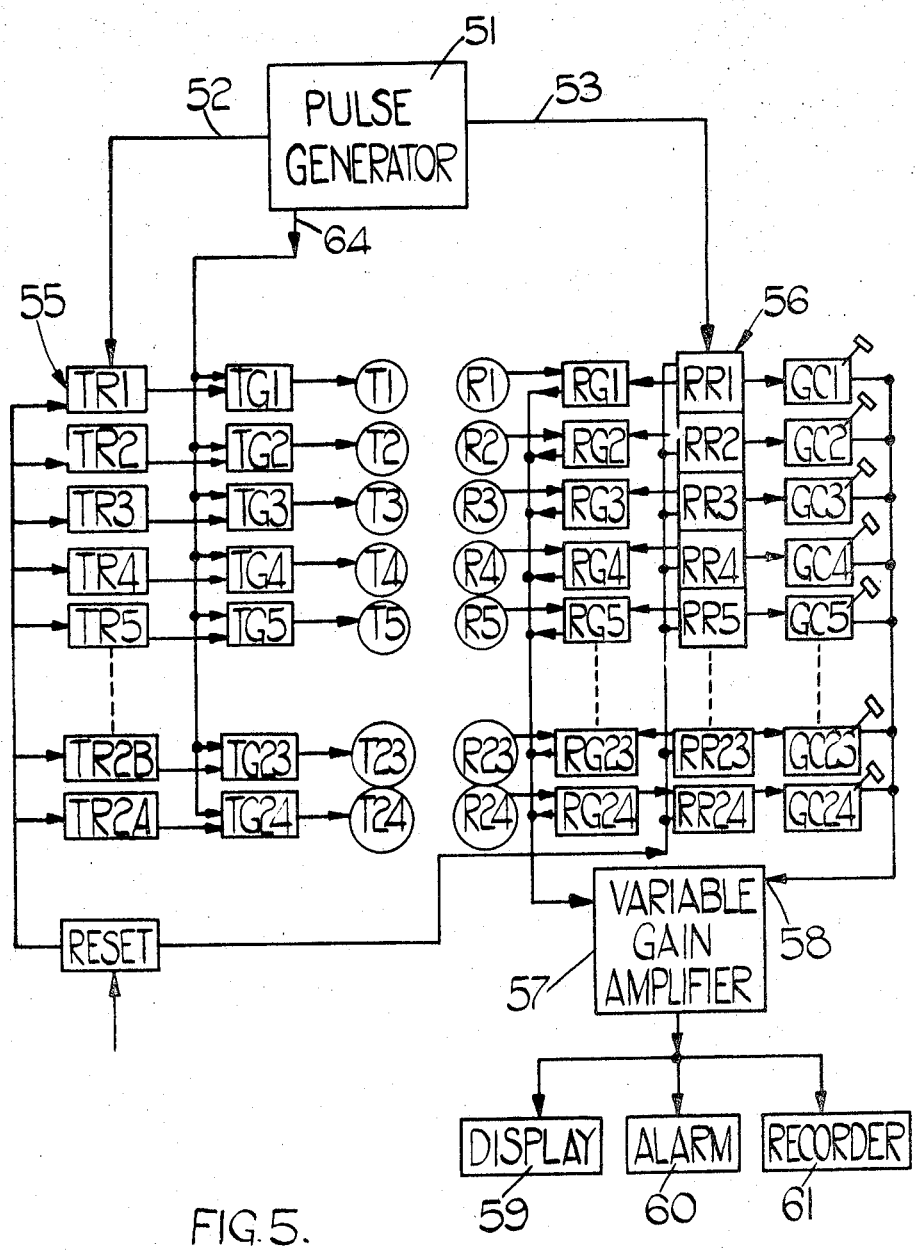

In the accompanying drawings:

FIG. 1 is a perspective view of an example of ultrasonic testing apparatus in accordance with the invention, FIG. 2 is an enlarged section through a head forming a part of the apparatus, FIG. 3 is a further enlarged fragmentary section on line 3—3 in FIG. 2, FIG. 4 is a still further enlarged fragmentary section on the line 4—4 in FIG. 3 of a single part of the head, and FIG. 5 is an electrical circuit diagram of the apparatus.

Referring to the drawings the apparatus includes a head 10 supported on a bed 11 incorporating a pair of aligned elongated troughs 12, 13 on opposite sides of the head 10. The bed also supports roller means for rotating and axially advancing a tube 14 carried thereby. Such roller means comprise a plurality of rollers 15 which are rotatable on axes skew to the tube axis and which are driven by a drive motor 16. The tube is held in contact with the rollers 15 by similarly skewed idling rollers 17 thrust downwardly on to the tube by pneumatic cylinder units 18. The skewness of the rollers 15, 17 can be adjusted to suit tubes of different diameters.

Turning now to FIG. 2 the head 10 consists basically of a pair of spaced parallel annular plates 19, 20 held apart by spacing means 21 to define a chamber 22 within the head. Extending through the chamber 21 between the plates 19, 20 are a plurality of probe carrier members 22 each in the form of a length of stainless steel tube. Each carrier member 22 is cut away at a pair of positions spaced from its ends to reveal an ultrasonic transducer element 23. This transducer 23 which is in the form of lead zirconate crystal wafer, silvered on both sides, is supported in a plane inclined to the axis of the carrier member 22 such that normals at the centres of the two transducers 23 on each carrier member 22 are co-planar and are equally inclined in opposite directions from a plane normal to the axis of the carrier member 22. In addition the centre point of each transducer 23 lies on the axis of the carrier member 22.

Each transducer 23 is actually supported on a backing 24 of tungsten powder-filled epoxy resin within a copper tube 25. The crystal 23 and the tube 25 are connected by leads 26, 27 to opposite ends of a coupling coil 28 wound in a groove in the extension of the carrier member 22 between the cut-away in which the transducer 23 is mounted and the adjacent end of the carrier member 22.

Each end of each carrier member 22 receives a plug 29 on which there is a threaded stem 30 co-axial with the carrier member 22. The interiors of the carrier members are filled with epoxy resin 31.

In the present example there are twenty four of the carriers 22 equi-angularly spaced around the axis of the head 10. Mounted in recesses in the outer faces of the plates 19, 20 are twenty-four pairs of connectors 32 each of which is connected to a coil 33 associated with the appropriate end on an associated one of the carrier members 22. Each such coil 33 is carried by a spool 34 surrounding the coil 28 at the associated end of the carrier member 22 concerned. The spool 34 also serves to compress against the associated plate 19 or 20 an O ring seal 35 which seals of the bore in the plate through which the carrier member 22 concerned passes. Another O ring seal 36 is compressed against the opposite end of each spool 34.

For angular adjustment of the carrier members 22 each member has attached to one of its ends, an arm 37 secured in position by means of the screw-threaded stem 30 on the carrier member 22. Each arm 37 has an abutment face 38 extending in an axial-radial plane with respect to the axis of the carrier. The arms 37 co-act with adjustable abutments 39 on a ring member 40 mounted in an annular recess in a disc 41 secured to the plate 20. The abutments 39 are, in fact, screws engaged in cross bores in pegs 42 projecting from the ring member 40. The ring member 40 is angularly movable about the axis of the head 10. Coil springs 43 act between pegs 44 on the arms 37 and the pegs 42 to urge all the arms 37 in clockwise directions as viewed in FIG. 3, so as to keep the abutment faces 38 in contact with the abutments 39. The springs 43 (which are omitted for clarity from FIG. 2) also serve to urge the ring member 40 in an anticlockwise direction as viewed in FIG. 2.

An adjusting screw 45, engaged in a tapped bore in the disc 41, abuts one face of a notch 46 cut in the outer periphery of the ring member 40. Thus simultaneous, equal angular displacements of all the carrier members 22 can be effected by turning of screw 45 which causes angular displacement of the ring member 40. Adjustment of the individual carrier members 22 can be effected utilizing the adjustable abutments 39.

A pointer 47 pivoted to the disc 41 is connected by a pin and slot connection to the ring member 30 so as to be swung on angular movement of ring member 40 relative to the disc 41. The pointer co-acts with a scale 48 to give a direct reading of the angle at which the aforementioned plane of the normals of the transducers on any carrier member 22 is inclined to a plane including the axes of the head and the carrier member concerned.

In use the chamber 9 of the head is kept full of water to act as a coupling medium for the ultrasonic waves passing between the transducers and the tube. A pair of guide bushes 49 guide the tube through the chamber 9 and these are associated with a pair of sealing devices 50 which minimise leakage of water from the chamber 9. These sealing devices 50 can be of various forms and their detailed construction is not relevant to the present invention.

Each coil 28 and the associated surrounding coil 33 forms a transformer coupling in the connection of the associated transducer 23 to a pulse source for energising the transducer or to a detector for detecting ultrasonic waves received by the transducer. In the arrangement described all the transducers 23 at the left hand side of FIG. 2 may be regarded as acting as transmitters whilst those at the right hand side act as receivers.

FIG. 5 shows an arrangement by means of which the transmitting transducers 23 are caused to transmit ultrasonic waves sequentially and the receiving transducers 23 are simultaneously scanned. The arrangement is controlled by a master pulse generator 51 which has three output connections 52, 53 and 54. At the connections 52 and 53 symmetrical square wave forms, 180° out of phase, are produced by the generator. At connection 54 a train of pulses commencing synchronously with the square waves at connection 52, but of short duration, are produced. The square wave form from connection 52 is used to drive a conventional ring counter 55 made up of individual bistable stages TR1, TR2 . . . TR24. The ring counter 55 is, as is conventional, such that one of the stages TR1 to TR24 delivers an output at any time, each input signal received by the counter acting to cause the stage following the stage currently producing an output, to commence producing an output whereupon the previously conducting stage ceases to produce an output. Ring counters of this type are well known and detailed description thereof herein would thus be redundant.

The outputs of the individual stages TR1 to TR24 of the counter 55 are connected respectively to inputs of a bank of electronic AND gates TG1 to TG24. These gates also have input connections from the connection 54 of the generator 51 and are of any known form such that an output signal is only produced by a gate while signals are being received at both of its input terminals.

The output connections of the gates TG1 to TG24 are connected respectively to transmitter circuits T1 to T24 including the twenty-four transmitting transducers 23 and their associated transformer couplings 28, 33. Thus the transmitting transducers 23 are briefly energised at the commencement of each cycle of the square wave.

There is also a twenty-four stage receiver ring counter 56 driven by the square wave form derived from the connection 53 of the generator 51. The stages RR1 to RR24 of this ring counter are respectively connected to receiver gates RG1 to RG24 so as to control the passing of signals from receivers R1 to R24 respectively, each including a receiving transducer 23 and the associated transformer coupling 28, 33 to an amplifier 57. A manual reset circuit is connected to reset the ring counters 55, 56 on starting up of the circuit to ensure that the first stage TR1 of counter 55 and the first stage RR1 of counter 56 are made to produce an output first. It will be appreciated that, thereafter, the ring counter 56 will always lag exactly one-half cycle of the square wave form behind the counter 55.

The amplifier 57 is of any convenient variable gain type with a gain control terminal 58 the magnitude of the voltage applied to which determines the gain of the amplifier. There are twenty-four gain control circuits GC1 to GC24 which are connected sequentially to the gain control terminal 58 under the control of the receiver ring counter 56. These gain control circuits are individually adjustable so that variations in the sensitivity of the individual transducer gate circuit arrangements can be allowed for. The circuits GC1 to GC24 are adjusted when the apparatus is set up to ensure that the output from the amplifier 20 is the same for a given flaw echo irrespective of which transducer is in position to receive the echo from the flaw.

The amplifier 57 is connected to feed any convenient display 59, an alarm 60 and/or a recorder 61 which makes a permanent record of flaw signals received by the amplifier 57.

For operation the carrier members 22 are set up at angles, in relation to the diameter and thickness of the tube under test, determined in accordance with the instructions given in United Kingdom Pat. No. 866,457. It is thereby ensured that ultrasonic waves reflected by the surface of the tube do not fall on the receiving transducers. Owing to the 180° phase lag of the square wave signal applied to the receiver ring counter 56 behind the square wave signal applied to the transmitter ring counter, the receiving transducers cannot pass signals to the amplifier until the emission of ultrasonic waves by the transmitting transducers has ceased. Thus the only significant signals received by the receiving transducers and passed by the receiver gates to the amplifier are waves actually rebounding from flaws within the wall of the tube.

The combination of the rapid scanning of the tube resulting from the sequential operation of the transmitter transducers and the sequential connection of the receiving transducers to the amplifier with the rotation of the tube as it is fed through the control passage in the head 10 ensures very complete coverage of the tube in the search for flaws therein. It is considered that each transmitter/receiver probe unit can effectively scan a portion of the periphery of the tube subtending an angle of 5° at the axis of the tube. Thus seventy-two probe units would be required for complete scanning of the periphery of the tube. In view of various size limitations, however, it has been found more convenient for the tube to be rotated to allow fewer probe units to be employed. With the twenty-four units employed in the example described a tube of up to two inches outer diameter could be fed through the head 10 at a speed of the order of 180 feet per minute if flaws of ½" length and less can be tolerated, whilst it is rotated at a rate in the region of 240 revolutions per minute. The tube rotates through one complete revolution for each three complete cycles of the ring counters.

The probe adjusting mechanism described above can also be employed when utilizing transducers in the form of crystal wafers each of which has its normal axis perpendicular to the carrier member axis. As described in U.S. application No. 712,085 such an arrangement may be employed with the transducers acting as transceivers or with any given transducer acting at a particular instant to pick up flaw signals reflected after an ultrasonic pulse has been transmitted by another transducer circumferentially spaced from that given transducer. A similar scanning arrangement is employed to connect the transducer sequentially to the generator and the detector.

This invention may also be used in conjunction with the invention described in our copending U.S. application No. 712,085 in which each carrier member carries a single crystal with its normal axis perpendicular to the carrier member axis. The crystals may be used as transceivers, in which the transmitter T, and the receiver R, share the same crystal. Alternatively the arrangement may be such that, at the commencement of a square wave signal cycle, one crystal is energised to transmit, and, half way through the cycle a receiver incorporating a different crystal passes its signals (if any) through to the amplifier. The arrangement described in specification No. 712,085 includes an adjustable phase control means for adjusting the phase relationship of the two ring counters to determine which of the receivers shall come into play after any given transmitter has been energised.

Having thus described my invention what I claim as new and desire to secure by Letters Patent is:

1. In an apparatus for testing tubes and other elongated workpieces for flaws by transmitting ultrasonic signals into the workpiece and receiving ultrasonic signals from the workpiece, a plurality of transducers for receiving the ultrasonic signals from the workpiece and converting them into electrical signals, an amplifier connected to said transducers for amplifying the signals produced by said transducers, sequence control means for permitting passage of signals from said transducers to the amplifier in a cyclic sequence, an automatic gain control means for the amplifier incorporating a plurality of pre-settable circuits, each circuit controlling the gain of the amplifier and each circuit being operated in synchronism with said sequence control means.

2. Apparatus as claimed in claim 1 in which said sequence control means comprises a ring counter driven by a pulse generator and having its individual stages connected to a plurality of gates respectively, said gates controlling the passage of signals from the transducers to the amplifier, said ring counter stages also being connected respectively to said pre-settable circuits of the gain control means.

References Cited

UNITED STATES PATENTS

| | | | |
|---|---|---|---|
| 3,285,059 | 11/1966 | Bogle | 73—67.9 |
| 3,373,602 | 3/1968 | Wendt et al. | 73—67.5 |

JAMES J. GILL, Primary Examiner